2,888,385
Patented May 26, 1959

2,888,385

PROCESS OF MAKING A PREPARATION CONTAINING LIPASES AND OXIDASES

Felix Grandel, Inningen, near Augsburg, Germany

No Drawing. Application November 27, 1953
Serial No. 394,893

Claims priority, application Germany November 28, 1952

14 Claims. (Cl. 195—67)

The present invention relates to a process of producing ferments and more particularly to a process of producing ferments from cultures of microorganisms.

The production of ferments from cultures of microorganisms is known. For this purpose a culture medium is inoculated with cultures of various molds, for instance, of the genera Aspergillus and Penicillium, such as *Aspergillus oryzae* or *Aspergillus niger*. Other ferment-forming molds, such as those of the genus Mucor, and also bacteria and yeasts which produce ferments, may, of course, also be employed for this purpose.

The nutrient medium usually employed in such cultivation processes consists of bran and certain mineral salts. Addition of proteinaceous materials, sugar, cellulose, and other additives to the nutrient medium, is also known. Mold or bacteria cultures grown on such nutrient media show a ferment content depending upon the type and the origin of the microorganism. Proteases and amylases are usually produced in this manner. The enzyme mixtures obtained thereby are used for many technical purposes, for instance, in bakeries, breweries, and for producing pharmaceutical preparations.

The conditions of cultivating said microorganism in order to produce such ferments, are well known. The growth of said microorganisms on the culture media used heretofore, however, is often unsatisfactory. Preparation of ferments by means of microorganisms usually requires 30-60 hours, depending upon the bacteria or mold cultures employed. The yield of ferments is comparatively low. Furthermore, mainly ferment mixtures rich in amylase and protease are obtained when proceeding according to the heretofore known processes. Very little attention has been given to the formation of lipase and oxidase by microorganisms.

It is one object of this invention to provide an improved process which allows the production of a ferment mixture rich in oxidase and lipase by means of microorganisms.

Another object of this invention is to provide an improved process of cultivating molds or bacteria and of accelerating the growth of said microorganisms in order to obtain ferment mixtures rich in oxidase and lipase.

A further object of this invention is to provide a nutrient medium for cultivating microorganisms capable of producing ferment mixtures rich in oxidase and lipase.

Still another object of this invention is to provide substances which, on addition to culture media, are capable of accelerating the growth of microorganisms and of increasing the yield of oxidase and lipase in the ferment mixtures obtained therefrom.

Other objects of this invention and advantageous features thereof will become apparent as the description proceeds.

In principle, the process according to the present invention consists in adding a vegetable oil sludge which is rich in phosphatides to culture media employed in the cultivation of microorganisms capable of producing ferment mixtures rich in oxidase and lipase. Such oil sludges rich in phosphatides are obtained, for instance, on allowing vegetable oils, recovered by hydraulic pressing of oil seeds, to settle. Especially suitable are vegetable oils having a high amount of highly unsaturated fatty acids. Such oil sludge may also be obtained from crude oil extracted by means of solvents from oil seeds. Such oil sludge rich in phosphatides has a considerable accelerating effect upon the growth of mold and bacteria cultures as they are used for producing ferment mixtures containing oxidase and lipase. The oil sludge is added to the culture medium either alone or together with small amounts of hydrogen peroxide and/or salts of hydrogen peroxide. Furthermore, it is of advantage to add vegetable material rich in peroxidase, such as horseradish, to the culture medium so as to improve the formation of oxidase. In this case, no hydrogen peroxide and/or salts thereof need be added. Addition of such oil sludge, especially of oil sludge obtained in the manufacture of unsaturated oils, to the culture medium, enriches said medium with growth-promoting substances. Furthermore, its oil content favors the formation of lipase by microorganisms. The addition of vegetable materials rich in peroxidase or of hydrogen peroxide and/or its salts causes a considerable increase in oxidase formation. It is understood that the use of such microorganisms which per se are capable of producing lipase and oxidase ferments at least in a small amount, is a prerequisite for the formation of such lipase and oxidase ferments. The following experiment may be described as a proof for such increased oxidase formation:

A culture medium consisting of bran and mineral salts of conventional composition is inoculated with *Aspergillus oryzae*. Said culture medium, after it has become completely covered by the microorganism within 3 days, shows an oxidase content of 40 mg. per 100 g. when cultivated under conventional conditions.

The same *Aspergillus oryzae* is cultivated under the same conditions as in the above-mentioned experiment on a nutrient medium to which oil sludge and 0.5% of sodium peroxide has been added. A mold bran is obtained which has a peroxidase activity of 120 mg. per 100 g. after deducting the blank value for sodium peroxide.

The production of ferment mixtures rich in oxidase and lipase and containing, besides, a number of other enzymes, such as diastases and proteases, is of the utmost importance in the production of a ferment diet. The use of oxidase and lipase ferments in ferment diets has heretofore been neglected, although said ferments play a dominating role in the maintenance of organic metabolic processes. All natural foodstuffs of vegetable as well as of animal origin contain in the crude, unaltered state small amounts of said ferments. These ferments, however, are usually destroyed by boiling, sterilizing, pasteurizing, roasting, frying, baking, refining, etc., when producing our civilisation diet. Consequently, our food is almost free of natural ferments and, undoubtedly, the great success achieved by uncooked food as dietary means must to a considerable extent be attributed to the richness in ferments of such uncooked food.

Heretofore it has been assumed that the ferments of our food are destroyed by pepsine and hydrochloric acid of the stomach; but this is an error. Investigations of Freudenberg and Buchs ("Die Biologie des Magenkathepsins" published by S. Karger, Basle, 1947) have proved that the ferments present in our food are preserved at a pH value of 6.0–6.5 in the food mash. Said ferments therefore pass through the stomach. Although the ferments in their complex form do not pass through the intestinal walls, there is no question that at least the co-ferments, which may be vitamins, are absorbed, and, thus, pass into the lymph track. As specific ferments they are re-formed in the body metabolism, and, thus, strengthen the ferment economy in the body.

Following the idea of supplementing our civilization food, which is almost free of ferments, by a diet rich in ferments, it has been found that ferment mixtures produced according to the present invention in the manner described above, especially ferment mixtures produced on culture media containing bran, have all the prerequisites for the production of a satisfactory and proper supplementary ferment diet.

The following examples serve to illustrate this invention, without, however, limiting the same thereto. Ferment mixtures obtained according to said examples can be used as such or in mixture with lactic acid cultures, milk sugar, fruit juices rich in vitamin C, drugs rich in oxidase, coarse, whole-grain meal, and other food and materials, and may be molded and shaped into tablets, granules, or the like.

*Example 1*

18 kg. of bran from wheat hulls are mixed with 6 kg. of wheat germ serving as peroxidase carrier, 1 kg. of oil sludge obtained on hydraulic pressing of linseed oil, 2.4 kg. of milk protein, 18 liters of a mineral salt solution conventionally used in cultivating microorganisms, and 18 liters of well water. The mixture is spread out on trays and is sterilized in a closed incubator by means of steam passing therethrough at a temperature of 100° C. for one hour. The culture medium is cooled to 30–35° C. and is incubated with conidia of a culture of *Aspergillus oryzae*, which is capable of forming large amounts of enzymes. The mold is allowed to grow on said culture media at a temperature of 28–30° C. Care must be taken that the incubator is well aerated with sterile air and is humidified during the growth of said microorganisms. The increase in temperature occurring thereby is dissipated by cooling with moist air. The temperature must not exceed 35° C. After 60–70 hours the culture medium is completely covered with a growth of said microorganism. The mold bran produced in this manner is broken up by means of a comminuting device provided with spiked rolls, and is dried in a drying chamber at 30–40° C. The culture obtained in this manner contains mainly amylases, proteases, lipases, and oxidases. It is finely ground, mixed with horse-radish, celery, leeks marjoram, dill, or paprika powder and is used as a spicy ferment preparation for sprinkling on soups, gravy, and the like. It can also be taken as such or together with water.

*Example 2*

10 kg. of coarse sawdust, 8 kg. of wheat bran, 1 kg. of oil sludge obtained on extracting corn germ oil with benzine, 0.1 kg. of 5% hydrogen peroxide, 6 kg. of oat hulls, 2 kg. of fish protein, 16 liters of water, and 18 liters of a conventional mineral salt solution, are intimately mixed with each other and are spread out on trays. Sterilization and incubation is effected as described in Example 1. Spores of *Aspergillus niger* are used as incubating material. The resulting material, rich in enzymes, is extracted with water, and the extract is concentrated by evaporation in a vacuum at 40° C. The syrup obtained in this manner contains the enzymes formed in the mold bran, i.e., amylases, proteases, lipases, and oxidases, in highly concentrated form, and can be employed for technical purposes, for instance, in the baking industry and in the textile industry.

*Example 3*

21 kg. of bran from wheat hulls, 1 kg. of oil sludge obtained on hydraulic pressing of wheat germ oil, 2 kg. of milk protein, 16 liters of well water, and 18 liters of a conventional nutrient salt solution are intimately mixed with each other, placed on trays, sterilized, and inoculated with spores of *Aspergillus oryzae*. The resulting mold culture mainly contains amylases, proteases, and lipases, but only small amounts of oxidases. It is dried, finely comminuted, and mixed with the juice of sallow thorn berries, glucose, lactic acid cultures, milk sugar, whole-grain meal, and others, and is converted into tablets. The tablets are excellent agents for regulating the gastro-intestinal activity.

Of course, many changes and variations in the composition of the culture medium, the microorganisms used, the cultivation conditions employed, the methods of working up the culture medium, and of isolating and purifying the ferments therefrom, the conversion of the ferment mixtures into technical, pharmaceutical, and dietary preparations and the like, may be made by those skilled in the art in accordance with the principles set forth herein and in the claims annexed hereto.

I claim:

1. In a process of producing ferment mixtures rich in oxidase and lipase from ferment-producing molds of the genera Aspergillus, Penicillium, and Mucor, the step which comprises adding to a conventional culture medium an oil sludge rich in phosphatides as it is obtained in the manufacture of oils from oil seeds.

2. In a process of producing ferment mixtures rich in oxidase and lipase from molds of the genera Aspergillus, Penicillium, and Mucor according to claim 1, wherein the oil sludge rich in phosphatides is an oil sludge obtained on settling of hydraulically pressed oil of oil seeds.

3. In a process of producing ferment mixtures rich in oxidase and lipase from molds of the genera Aspergillus, Penicillium, and Mucor according to claim 1, wherein the oil sludge is an oil sludge obtained on settling of oil extracted from oil seeds.

4. In a process of producing ferment mixtures rich in oxidase and lipase from molds of the genera Aspergillus, Penicillium, and Mucor according to claim 1, wherein the oil sludge is an oil sludge containing highly unsaturated fatty acids.

5. In a process of producing ferment mixtures rich in oxidase and lipase from ferment-producing molds of the genera Aspergillus, Penicillium, and Mucor, the steps which comprise adding to a conventional culture medium an oil sludge rich in phosphatides as it is obtained in the manufacture of oils from oil seeds, and a small amount of a peroxide compound selected from the group consisting of hydrogen peroxide, its salts, and mixtures thereof, and cultivating said molds on said culture medium.

6. In a process of producing ferment mixtures rich in oxidase and lipase from ferment-producing molds of the genera Aspergillus, Penicillium, and Mucor, the steps which comprise adding to a conventional culture medium an oil sludge rich in phosphatides as it is obtained in the manufacture of oils from oil seeds, and vegetable material rich in peroxidase, and cultivating said molds on said culture medium.

7. In a process of producing ferment mixtures rich in oxidase and lipase from ferment-producing molds of the genera Aspergillus, Penicillium, and Mucor, the steps which comprise adding to a conventional culture medium an oil sludge rich in phosphatides as it is obtained in the manufacture of oils from oil seeds, a small amount of a peroxide compound selected from the group consisting of hydrogen peroxide, its salts and mixtures thereof, and vegetable material rich in peroxidase, and cultivating said molds on said nutrient medium.

8. A culture medium for cultivating microorganisms yielding lipases and oxidases on conventional culture media, said culture medium comprising conventional components and an oil sludge rich in phosphatides, said oil sludge being obtained in the manufacture of vegetable oils from oil seeds, said culture medium being adapted to cause production of high amounts of lipases and oxidases.

9. A culture medium for cultivating microorganisms yielding lipases and oxidases on conventional culture media, said culture medium comprising conventional components, an oil sludge rich in phosphatides, said oil sludge being obtained in the manufacture of vegetable oils from oil seeds, and a small amount of a peroxide compound selected from the group consisting of hydrogen peroxide, its salts, and mixtures thereof, said culture medium being adapted to cause production of high amounts of lipases and oxidases.

10. In a process of producing ferment mixtures rich in oxidase and lipase by cultivating a ferment-producing mold of the genera Aspergillus, Penicillium, and Mucor on a culture medium, the steps which comprise adding to a conventional culture medium between about 1.3% and about 1.4% of a vegetable oil sludge, rich in phosphatides, obtained on allowing to settle vegetable oils recovered from oil seeds, and cultivating said mold on said culture medium.

11. In a process of producing ferment mixtures rich in oxidase and lipase by cultivating a ferment-producing mold of the genera Aspergillus, Penicillium, and Mucor on a culture medium, the steps which comprise adding to a conventional culture medium between about 1.3% and about 1.4% of a wheat germ oil sludge, rich in phosphatides obtained on allowing to settle wheat germ oil recovered from wheat germs, and cultivating said mold on said culture medium.

12. In a process of producing dietary preparation from lipase and oxidase-producing molds of the genera Aspergillus, Penicillium, and Mucor, the steps which comprise adding to a conventional culture medium a vegetable oil sludge, rich in phosphatides, obtained on allowing to settle vegetable oils recovered from oil seeds, cultivating said molds on said culture medium until substantially optimum ferment formation is achieved, comminuting the resulting culture, mixing said comminuted culture with other dietary supplements, and converting the resulting mixture into non-pulverulent solid compact form.

13. In a process of producing a dietary preparation from *Aspergillus oryzae*, the steps which comprise adding to a conventional culture medium a vegetable oil sludge, rich in phosphatides, obtained on allowing to settle vegetable oils recovered from oil seeds, cultivating *Aspergillus oryzae* on said culture medium until substantially optimum ferment formation is achieved, comminuting the resulting culture, mixing said comminuted culture with other dietary supplements, and converting the resulting mixture into non-pulverulent solid compact form.

14. In a process of producing a dietary preparation from *Aspergillus oryzae*, the steps which comprise adding to a conventional culture medium a wheat germ oil sludge obtained on allowing wheat germ oil to settle, cultivating *Aspergillus oryzae* on said culture medium until substantially optimum ferment formation is achieved, comminuting the resulting culture, mixing said comminuted culture with other dietary supplements, and converting the resulting mixture into non-pulverulent solid compact form.

References Cited in the file of this patent

UNITED STATES PATENTS

| | | |
|---|---|---|
| 1,391,219 | Takamine | Sept. 20, 1921 |
| 1,611,700 | Waksman | Dec. 21, 1926 |
| 2,480,090 | Symthe | Aug. 23, 1949 |

FOREIGN PATENTS

| | | |
|---|---|---|
| 679,087 | Great Britain | Sept. 10, 1952 |

OTHER REFERENCES

Tauber: Chemistry and Technology of Enzymes, Wiley, 1949, page 401.